Patented Feb. 20, 1951

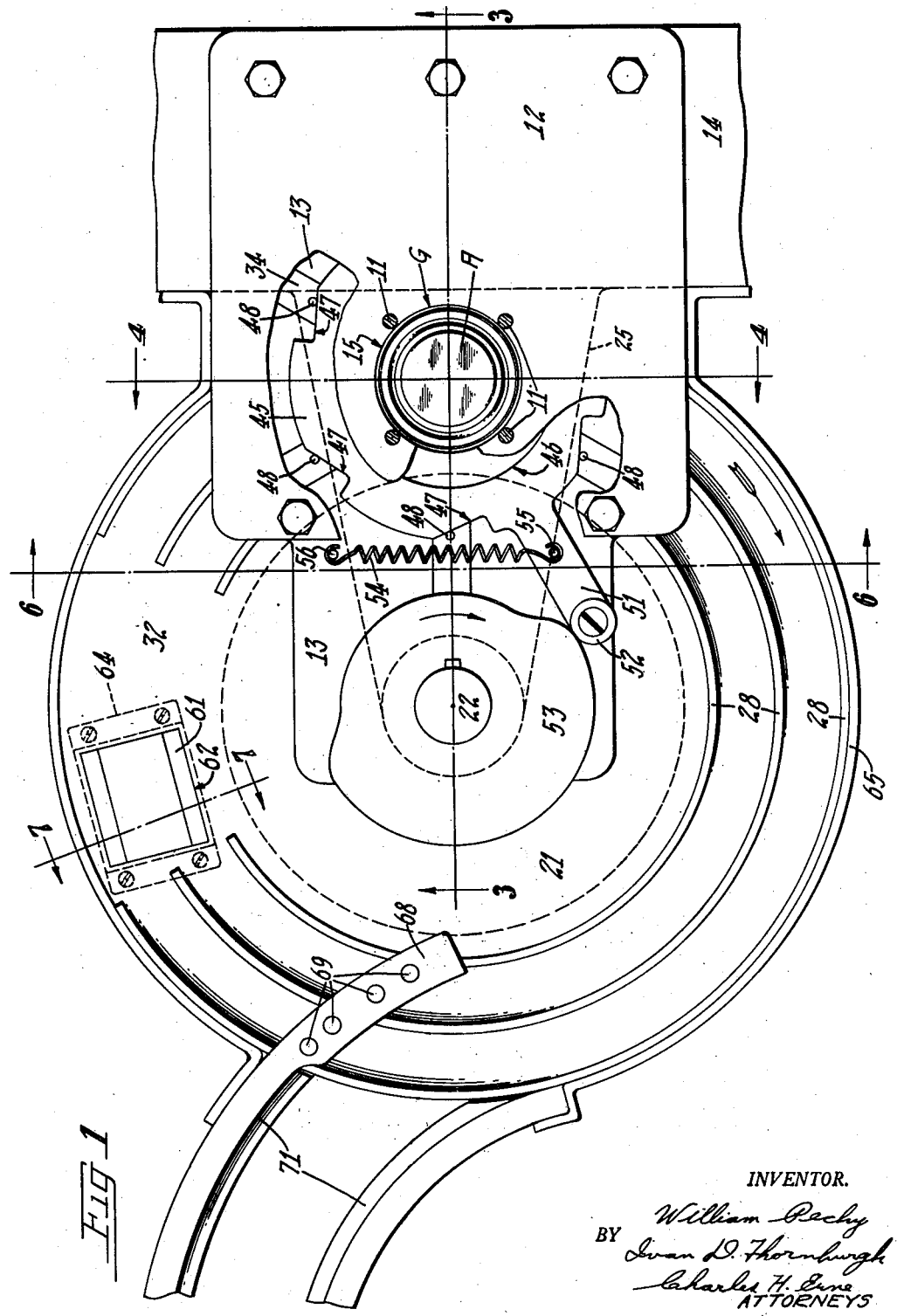

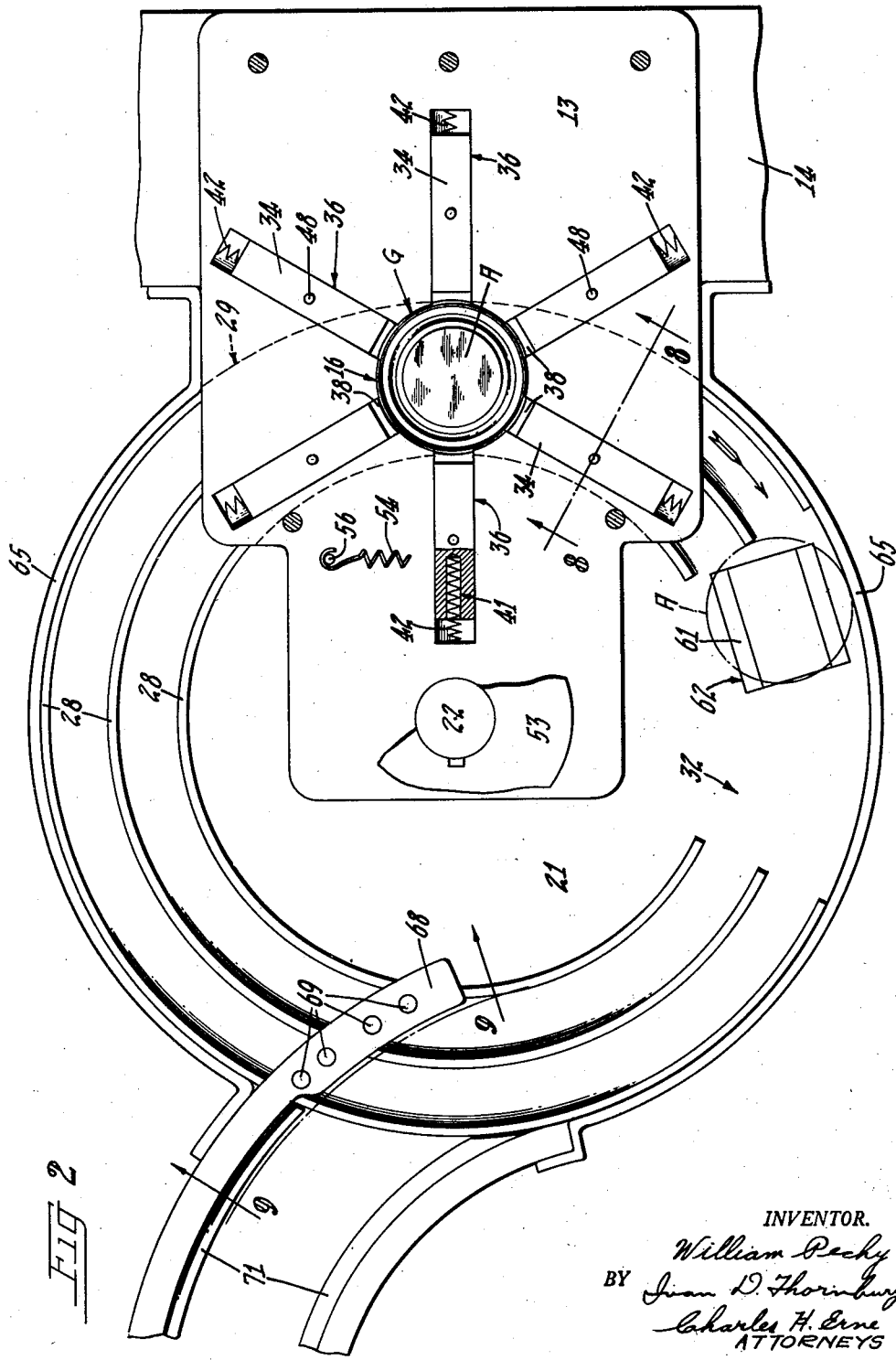

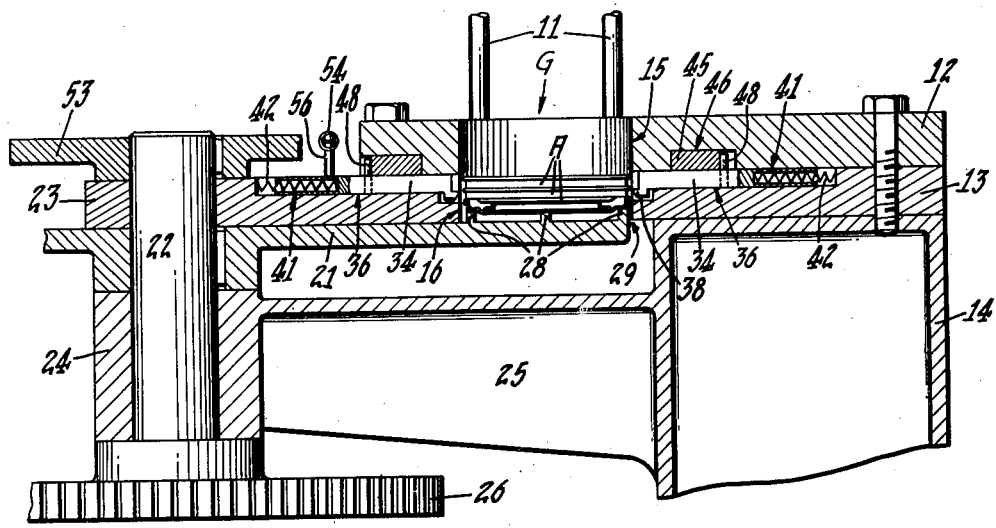
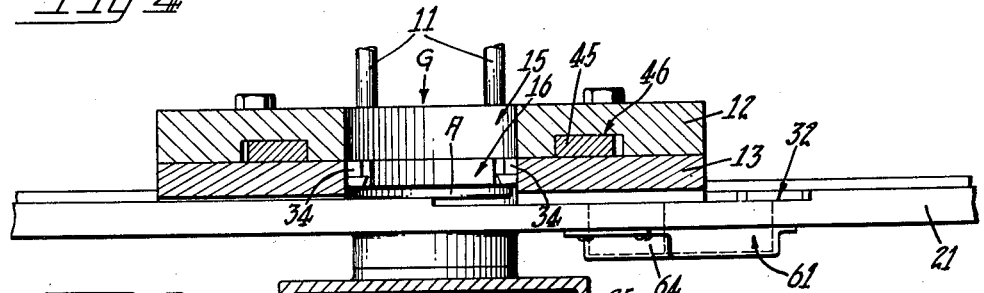
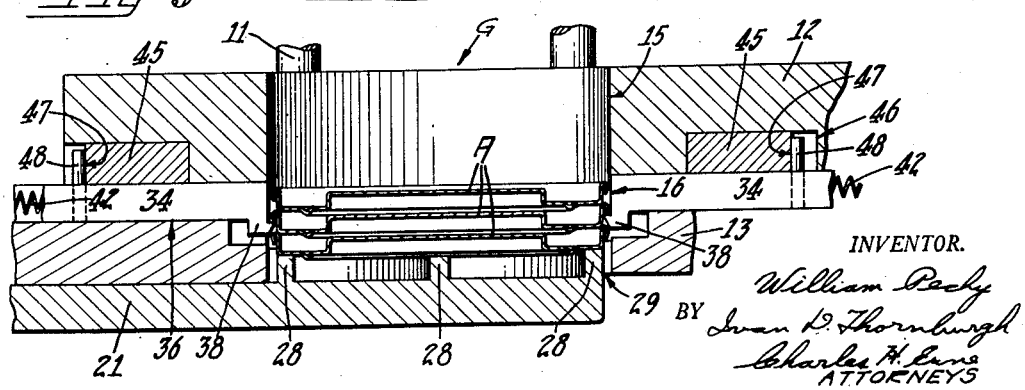

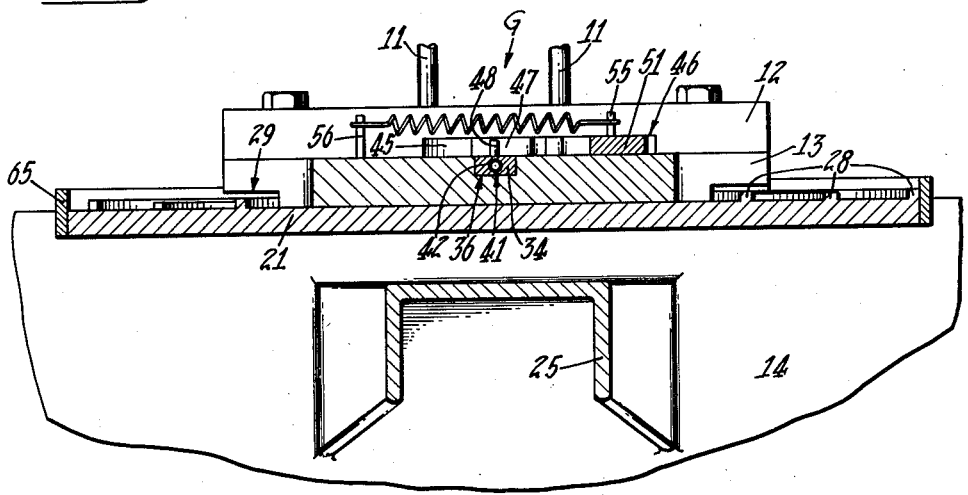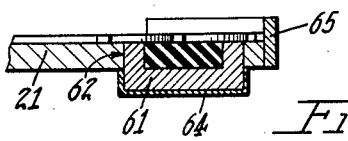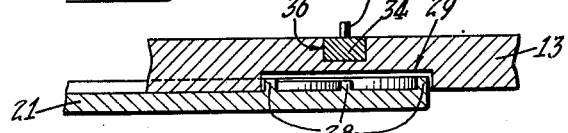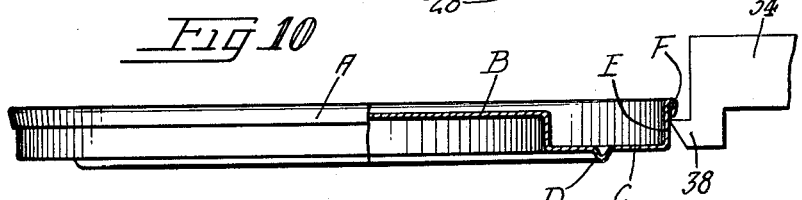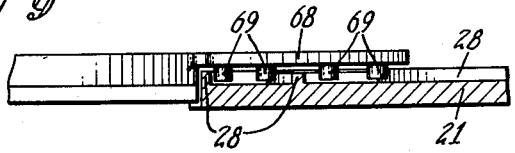

2,542,053

UNITED STATES PATENT OFFICE 2,542,053

ARTICLE SEPARATING AND FEEDING DEVICE

William Pechy, Manasquan, N. J., assignor to American Can Company, New York, N. Y., a corporation of New Jersey Application September 2, 1948, Serial No. 47,403

2 Claims. (Cl. 113—114)

1

The present invention relates to devices for separating and feeding can or container covers and other similar articles from a stack and has particular reference to such a device having elements for rapidly separating articles individually from the stack while holding the remaining articles in the stack against displacement.

An object of the invention is the provision of devices for separating and feeding articles from a stack wherein simple rapidly movable elements are utilized to separate and feed the articles individually from the stack at high speed rates of feeding without experiencing jams and other difficulties that usually cause damage to the device.

Another object is the provision of such a device wherein the stack of articles is alternately clamped in place beyond an individual article to be separated therefrom for segregating the article and released for positioning another article for subsequent segregation and separation, so that the articles may be separated and fed from the stack in rapid succession by a gravity pull on the segregated article.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a separating and feeding device embodying the present invention, with parts broken away and parts shown in section;

Fig. 2 is a view similar to Fig. 1 with certain parts removed and with other parts shown in different positions;

Fig. 3 is a longitudinal section taken substantially along the line 3—3 in Fig. 1;

Fig. 4 is a transverse sectional view taken substantially along the line 4—4 in Fig. 1, with all but one of the articles to be separated, removed;

Fig. 5 is an enlarged fragmentary view similar to Fig. 3 with certain of the parts of the device in a different position, Fig. 6 is a transverse sectional view taken substantilly along the line 6—6 in Fig. 1;

Fig. 7 is a sectional view taken substantially along the line 7—7 in Fig. 1;

Fig. 8 is a sectional view taken substantially along the line 8—8 in Fig. 2;

Fig. 9 is a sectional view taken substantially along the curved line 9—9 in Fig. 2; and Fig. 10 is an enlarged view of an exemplary can or container cover to be separated from a stack of such covers, the view showing a portion of a clamping finger for periodically holding the stack in place, part of the cover being broken away and shown in section.

As a preferred and exemplary embodiment of the instant invention the drawings illustrate a

2 device for separating and feeding cup-shaped shells such as can or container covers A and similar articles, in timed relation from a stack of such articles. In the drawings can covers in an inverted position for convenient feeding are shown by way of example.

The covers A (see Fig. 10) are formed with a top wall having a countersunk panel B which is surrounded by a connecting annular wall section C having an outwardly projecting annular bead D. The outer periphery of the wall section C merges into a surrounding skirt or flange wall E which terminates in a smooth edge F which is folded back on itself in a conventional hem or if desired in an open curl. When in stacked relation such covesrs have a tendency to nest or stick together, although the invention is equally adapted to covers or other articles which do not have this nesting tendency. While the covers A as shown are circular in shape, the invention is not limited to such covers but is equally well adapted to rectangular and other shaped articles.

The invention is equally well adapted to a vertically or horizontally disposed separating device, the latter being shown in the drawings. In such a device, the stack of covers A is disposed in an upright position and the covers are fed from the bottom of the stack. For this purpose the stack of covers is disposed in a magazine G (Figs. 1 to 5 inclusive) which comprises a plurality of upright rods 11 which retain the covers in stacked formation. These rods adjacent their lower ends are secured in a support plate 12 which preferably is disposed in a horizontal position and which is bolted to an underlying auxiliary support plate 13. Along one edge, both plates are secured to a frame 14 which constitutes the main frame of the device. A portion of the plates overhang the frame and it is in this overhanging portion that the magazine G is located. The stack of covers in the magazine extends down through vertically aligned openings 15, 16 formed in the plates 12, 13 respectively.

The stack of covers A within the magazine G is supported periodically on a rotatable disc 21 which constitutes a movable member or cover carrier and which is disposed preferably in a horizontal position with a portion of the disc in engagement with the underside of the auxiliary support plate 13. The disc is mounted on and keyed to a vertical shaft 22 (Fig. 3) journaled in a bearing 23 formed in the auxiliary support plate 13 adjacent the magazine G and in a bearing 24 formed in a bracket 25 which extends out from the main frame 14. The shaft 22 and the disc 21 attached thereto are rotated in any suitable manner, as by a gear 26 carried on the lower end of the shaft.

The outer marginal edge portion of the disc 21 extends under the magazine G for supporting the stack of covers within the magazine. For this purpose the outer marginal edge portion of the upper face of the disc is formed with a plurality of laterally spaced and parallel or concentric ribs 28 which extend around the disc for a major portion of its circumference. The drawings show three of these ribs 28, the outer and the inner ribs being spaced apart a distance slightly less than the outer diameter of the covers A. These ribs extend up from the upper face of the disc 21 a distance slightly greater than the overall height or thickness of a cover A. They operate in a wide curved clearance groove 29 (Figs. 2, 5 and 8) formed in the bottom of the auxiliary support plate 13 and located directly under the magazine G.

The stack of covers A normally rest on the ribs 28, the cover wall section C of the lowermost cover in the stack engaging against and riding on the outer and inner ribs as the disc rotates, while the intermediate rib 28 engages and slides on the bead D of the cover. The height of the intermediate rib 28 is made slightly less than the others to compensate for the height of the bead D.

Preferably at one place in the circumference of the disc 21, the ribs 28 are cut away or terminated as in a step and thus form a depressed circumferential section, recess, notch, offset, or opening 32 (Figs. 1, 2 and 4) which is large enough to receive a cover A and which is in circumferential alignment with the ribs 28 so that it will pass under the magazine G as the disc rotates. As shown in the drawings the bottom of the recess 32 is defined by the upper face of the disc 21. The sides of the recess are open, only the terminal ends of the ribs 28 defining the forward and rearward end walls of the recess. One set of these terminal ends of the ribs 28 serves as feeding shoulders or elements for a received cover as will be hereinafter explained. If desired more than one of these recesses may be formed in the disc to effect greater volume of cover feeding.

Hence as the disc rotates, the ribs 28 travel under the magazine G and support the stack of covers A located therein until the recess 32 comes adjacent the magazine. As the recess passes under the magazine the lowermost or engaged cover A, falls by gravity into the recess and is thereby separated from the remainer of the stack and is advanced or fed with the disc by the terminal ends or shoulders of the ribs 28 adjacent the recess.

During this cover separating operation, the stack of covers above the lowermost cover is held against dropping with the lowermost cover so that only the lowermost cover will fall into the disc recess 32. This holding of the stack is brought about by escapement mechanism comprising a plurality of clamping fingers or elements 34 (Figs. 2, 3, 4 and 5) which are disposed radially around the magazine opening 16 in the auxiliary support plate 13. These fingers preferably are rectangular in shape and are slidable in grooves 36 (see also Fig. 6) formed in the auxiliary support plate 13, the fingers being retained against displacement by the overlying support plate 12.

The inner ends of the clamping fingers 34, adjacent the opening 16, are formed with tapered clamping jaws 38 (see Fig. 10) for engagement with the cover A next above the lowermost cover in the stack. The outer ends of the fingers are formed with spring seats 41 (Figs. 2 and 3) which house compression springs 42 interposed between the bottom of the seats in the fingers and the plate 13 at the outer ends of the grooves 36. These springs urge the fingers inwardly toward the covers A in the magazine.

Control of the clamping fingers 34 is effected by a cam actuated cam ring 45 (Figs. 1, 3, 4 and 5) which surrounds the magazine G. This ring is located between the support plates 12, 13 and is slideably disposed in an annular groove 46 formed in the support plate 12. The outer edge of the ring is formed with a plurality of inwardly tapered cam surfaces 47. There is one cam surface for each clamping finger 34 and the cam surface for a corresponding finger is engaged by a cam pin 48 which projects up from the finger. The compression springs 42 in the clamping fingers keep the cam pins in engagement with the cam surfaces on the ring.

In operation the cam ring 45 is rotated periodically and partially within its seat or groove 46 to effect inward and outward movement of the clamping fingers 34. The normal position of the ring is shown in Figs. 1, 2 and 3. In this position the cam pins 48 engage the tapered cam surfaces 47 adjacent the outer end of the surface and thus hold the clamping fingers in an outward or expanded position away from the stack of covers A in the magazine. When the ring and the fingers are in these positions, the stack of covers A is unclamped and is supported on the ribs 28 of the rotating disc 21.

Just before the separating recess 32 in the rotating disc 21 moves into alignment with magazine G to receive the lowermost cover A in the stack, the cam ring 45 is rotated in a clockwise direction as viewed in Fig. 1 and this shifts the cam surfaces 47 and thus permits the cam pins 48 and their clamping fingers 34 to move inwardly under the force of the compression springs 42. The inward movement of the fingers brings their inner clamping jaws 38 into engagement with the cover A next above the lowermost cover (see Figs. 5 and 10) as hereinbefore explained and thus temporarily holds and supports the stack of covers above the lowermost cover. It is this manner of transferring the support of the stack from the ribs 28 of the disc 21 to the clamping fingers 34 just prior to alignment of the disc recess 32 with the magazine, that permits the lowermost cover to be segregated from the stack and to fall into the recess and thus become separated and carried from the stack.

As soon as the recess 32 after receiving the segregated cover, passes the magazine, the cam ring 45 is rotated in a counterclockwise direction as viewed in Fig. 1 and thus the cam surfaces 47 acting against the cam pins 48, force the clamping fingers 34 outwardly against the resistance of their springs 42. This action withdraws the clamping jaws 38 from the magazine and thus permits the entire stack to fall the height of one cover, onto the ribs 28 of the rotating disc 21 for positioning the next cover in the stack for a repeat cycle of operation of segregating and separating this cover from the stack as explained above.

Rotation or oscillation of the cam ring 45 preferably is effected by cam action in time with the rotation of the disc 21. For this purpose the cam ring is formed with a projecting arm 51 (Figs. 1 and 6) which at its outer end carries a cam roller 52. This cam roller operates on an edge cam 53 mounted on and keyed to the upper end of the disc shaft 22 (Figs. 1 and 3). A tension spring 54 keeps the cam roller in engagement with the cam. One end of this spring is hooked over a pin 55 secured in the cam arm 51 while the opposite end of the spring is engaged with a pin 56 which projects up from the auxiliary support plate 13.

Provision is made for retaining a separated cover A received in the disc recess 32, in position against displacement from the recess during travel of the cover with the rotating disc 21. This is brought about by a gripper element carried in the disc adjacent the recess. The drawings show by way of example, a permanent magnet 61 (Figs. 1, 2, 4 and 7) although the invention is equally well adapted to the use of other means such as an electro-magnet or a vacuum cup controlled by suitable switch or valve elements. The magnet 61 is set into a clearance opening 62 in the recess portion of the disc 21 adjacent the leading terminal ends of the ribs 28 which form the rearward wall of the recess 32. The top of the magnet is flush with the upper surface of the disc. The magnet is held in place by a U-shaped strap 64 secured to the lower face of the disc as best shown in Figs. 4 and 7.

Hence as a cover A falls into the recess 32 of the rotating disc 21, it engages against the magnet 61 and is thus held against displacement from the recess. The magnet also attracts the falling cover and thus guides it into proper position in the recess. In order to accommodate the device for nonmagnetic articles a curved guide rail 65 (Figs. 1, 2 and 7) is disposed adjacent the outer periphery of the disc 21. This rail prevents the article from being thrown by centrifugal force from the disc recess 32.

A separated cover A received in the recess 32 of the rotating disc 21 is carried along a curved path of travel toward a discharge station where the cover is swept out of its recess to any suitable place of deposit, such as for example, a subsequent operation machine or the like. In the instant device this removal of the cover is effected by a stationary discharge or rake element 68 which extends across the top of the rotating disc 21 at an angle to its path of rotation. This rake element includes a plurality of depending pins or prongs 69 arranged in a line across the path of travel of the disc at the angle of the rake and extending down into the spaces between the ribs 28. The prongs extend down close to the upper surface of the disc so as to engage a cover in the disc recess 32 as the disc carries the cover forward and thus sweep it laterally through the open side of the recess. A pair of spaced and parallel guide rails 71 formed as a part of the rake 68 or secured thereto, receive and direct the swept-out cover to its place of deposit.

With such a construction of separating and feeding device the various moving parts are of simple construction and are particularly adapted to high speed operation. The feeding disc being of a rotary nature permits of separating and feeding can covers at exceedingly high speeds ranging upward of 600 covers per minute without jams or other difficulties and is therefore well adapted to the new high speed can making machinery now being produced.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof

I claim:

1. In a separating and feeding device for container covers and similar articles arranged in a stack, the combination of a magazine for the stack of articles, a rotatable disc member disposed below said magazine, said disc member having a supporting surface movable under an open end of said magazine for supporting the stack of articles within said magazine, said surface having a recess with an integral bottom alignable with the open end of said magazine for receiving, supporting and advancing the nearest article from said stack, said recess having at least one side open for discharge of said article laterally from said recess, escapement means cooperating with said disc member for releasing said articles singly from said stack and into said recess, article-attracting means in the bottom of said recess to attract and hold said article in said recess during advancement with said disc member, means for moving said disc member and said escapement means in timed relation to each other, and means for discharging said article laterally from said open side of said recess.

2. In a separating and feeding device for container covers and similar articles arranged in a stack, the combination of a magazine for the stack of articles, a rotatable disc member disposed adjacent said magazine, said disc member having a plurality of concentric spaced ribs, said ribs defining a supporting surface movable adjacent an open end of said magazine for supporting the stack of articles within said magazine, said surface having a recess with an integral bottom alignable with the open end of said magazine for receiving, supporting and advancing the nearest article from said stack, said recess having at least one side open for discharge of said article laterally from said recess, escapement means cooperating with said disc member for releasing said articles singly from said stack and into said recess, article-attracting means in the bottom of said recess to attract and hold said article in said recess during advancement with said disc member, means for moving said disc member and said escapement means in timed relation to each other, and a stationary rake element having prongs extending into the spaces between the ribs of said disc member for discharging said article laterally from said open side of said recess.

WILLIAM PECHY.

REFERENCES CITED

The following references are of record in the file of this patent:

UNITED STATES PATENTS

| Number | Name | Date |
|--------|------|------|
| 1,034,373 | Smith | July 30, 1912 |
| 1,047,026 | Flounders | Dec. 10, 1912 |
| 1,053,209 | Neumann | Feb. 18, 1913 |
| 1,139,070 | Phelps | May 11, 1915 |
| 1,141,339 | Hodgson | June 1, 1915 |
| 1,438,024 | Duncan | Dec. 5, 1922 |
| 2,326,794 | Nordquist | Aug. 17, 1943 |
| 2,335,239 | Gladfelter | Nov. 30, 1943 |
| 2,453,545 | Simpson | Nov. 9, 1948 |